United States Patent
Toshima et al.

(10) Patent No.: US 6,312,622 B1
(45) Date of Patent: Nov. 6, 2001

(54) COMPOSITE NICKEL FINE POWDER

(75) Inventors: Yoshiharu Toshima; Takayuki Araki; Yasuhide Yamaguchi, all of Yamaguchi (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/699,449

(22) Filed: Oct. 31, 2000

(30) Foreign Application Priority Data

Nov. 1, 1999 (JP) .................................................. 11-311203

(51) Int. Cl.$^7$ ................................ H01B 1/02; B32B 5/16; H01G 4/008
(52) U.S. Cl. ....................... 252/513; 252/518.1; 428/403; 361/305; 361/306.3
(58) Field of Search ................................ 252/513, 518.1; 75/255; 428/403; 361/305, 306.3

(56) References Cited

U.S. PATENT DOCUMENTS

| 4,598,058 | * | 7/1986 | Frank et al. | ........................ 502/183 |
| 4,874,430 | * | 10/1989 | Bornstein | ............................... 75/234 |
| 5,368,933 | * | 11/1994 | Aoki et al. | ........................... 428/329 |

* cited by examiner

*Primary Examiner*—Mark Kopec
(74) *Attorney, Agent, or Firm*—Young & Thompson

(57) ABSTRACT

Composite nickel fine powder comprises metal nickel fine particles, at least one member attached to the surface of the fine particles and selected from the group consisting of oxides and double oxides containing at least one metal element selected from the group consisting of the Groups 2 to 14 of the Periodic Table and whose atomic number falls within the range of from 12 to 82, and a saturated or unsaturated fatty acid supported on the surface of the nickel fine particles provided thereon with the oxide and/or double oxide attached thereto. The composite nickel fine powder is excellent in resistance to heat shrinkage, has a high tap density, and has characteristic properties suitable for use as a material for making a conductive paste.

17 Claims, No Drawings

COMPOSITE NICKEL FINE POWDER

BACKGROUND OF THE INVENTION (a) Field of the Invention

The present invention relates to composite nickel fine powder in which an oxide and/or a double oxide of a metal element are attached to the surface of metal nickel fine particles and a fatty acid is further supported on the surface of the nickel fine particles provided thereon with the oxide and/or double oxide attached thereto. More specifically, the present invention pertains to composite nickel fine powder, which is excellent in resistance to heat shrinkage, which has a high tap density, which permits the formation of a printed wiring having a high density after the powder is formed into a paste and then dried, which permits the formation of an electrode having a high density after firing and which has characteristic properties suitable for use as a material for forming a conductive paste and in particular as an internal electrode material for multilayer ceramic capacitors.

(b) Description of the Prior Art

The multilayer ceramic capacitor is in general produced by alternately putting ceramic dielectric materials and internal electrodes in layers, followed by pressing them to each other and firing the resulting assembly to thus integrate the foregoing elements. The internal electrode for such a multilayer ceramic capacitor is in general produced by forming metal fine powder as an internal electrode material into a paste, printing the paste on a ceramic substrate, putting a plurality of the printed substrates in layers, integrating them by pressing with heating and then heating and firing the resulting assembly in a reducing atmosphere. As such internal electrode materials, there have conventionally been used, for instance, palladium and platinum. However, there have recently been developed various techniques, which make use of base metals such as nickel in place of noble metals such as platinum and palladium and a great advance has been made in such techniques.

If metal nickel powder is used as the internal electrode material, however, it has a tendency of undergoing rapid heat-shrinkage at a temperature around 700° C., although this tendency depends on the particle size of the nickel powder.

On the other hand, the firing temperature used when producing a multilayer ceramic capacitor may vary depending on the compounds constituting a ceramic dielectric material and when using, for instance, a ceramic dielectric material consisting of a perovskite-type double oxide such as $BaTiO_3$ or $SrTiO_3$, it is required to use a firing temperature of not less than 1200° C. The nickel fine powder used for forming an electrode undergoes heat-shrinkage severer than those observed for dielectric materials at such a high temperature. For this reason, the multilayer ceramic capacitor undergo delamination, crack-formation and/or warpage due to the heat-strain generated between the laminated dielectric layer and nickel layer and this in turn results in the deterioration of the quality of the multilayer ceramic capacitor.

As a means for eliminating this drawback, it would be regarded, as important, that the temperature at which any rapid heat-shrinkage is initiated is shifted toward the higher temperature side to thus approach the heat-shrinkage curve of nickel fine powder for forming a paste used in the production of a multilayer ceramic capacitor to the heat shrinkage curve of the ceramic base material. To this end, there has been proposed a technique for applying a metal oxide or a double oxide onto the surface of individual nickel fine particles.

However, such a technique for applying a metal oxide or a double oxide onto the surface of nickel fine particles suffers from such a problem that the surface area of individual fine particles increases and that the tap density thereof is reduced. Accordingly, it would be quite difficult to achieve a printed wiring having a desired high density when forming a conductive paste and then drying the same.

SUMMARY OF THE INVENTION

Accordingly, it is an object of the present invention to provide composite nickel fine powder, which is excellent in resistance to heat shrinkage, which has a high tap density, which permits the formation of a printed wiring having a high density after the powder is formed into a paste and then dried, which permits the formation of an electrode having a high density after firing and which has characteristic properties suitable for use as a material for forming a conductive paste and in particular as an internal electrode material for multilayer ceramic capacitors.

The inventors of this invention have conducted various studies to achieve the foregoing object, have found that composite nickel fine powder having the foregoing characteristic properties can efficiently be produced by attaching a specific oxide and/or a specific double oxide of a metal element to the surface of metal nickel fine particles and further applying a fatty acid on the surface of the nickel fine particles provided thereon with the oxide and/or double oxide attached thereto and thus have completed the present invention based on the foregoing finding.

According to the present invention, there is thus provided composite nickel fine powder which comprises metal nickel fine particles, at least one member attached to the surface of the nickel fine particles and selected from the group consisting of oxides and double oxides containing at least one metal element selected from the group consisting of the Groups 2 to 14 of the Periodic Table and whose atomic number falls within the range of from 12 to 82, and a saturated or unsaturated fatty acid supported on the surface of the nickel fine particles provided thereon with the oxide and/or double oxide attached thereto.

DESCRIPTION OF THE PREFERRED EMBODIMENTS

The metal nickel fine particles constituting the composite nickel fine powder of the present invention can be prepared by either a dry method, which comprises vapor phase hydrogen reduction of nickel salt vapor, or a wet method, which comprises reducing an aqueous solution containing a nickel salt with a reducing agent under specific conditions to thus precipitate nickel fine particles.

The metal nickel fine particles constituting the composite nickel fine powder of the present invention are in general fine particles of elemental nickel, but the surface of the elemental nickel may be oxidized.

The particle size of the metal nickel fine particles is in general not more than 5 $\mu$m and preferably not more than 1 $\mu$m when using the composite nickel fine powder in the form of a paste for forming an internal electrode of a multilayer ceramic capacitor. More preferably, the particle size of the composite particles comprising metal nickel fine particles and the oxide and/or double oxides attached to the surface of the former is not more than 1 $\mu$m.

The oxide and double oxide constituting the composite nickel fine powder of the present invention is at least one member selected from the group consisting of oxides and double oxides containing at least one metal element selected from the group consisting of the Groups 2 to 14 of the Periodic Table and whose atomic number falls within the range of from 12 to 82. The composite nickel fine powder of the present invention is, for instance, used as a material for forming a conductive paste, in particular, as a material for the internal electrode of a multilayer ceramic capacitor. In such case, the oxides and double oxides are preferably those containing at least one metal element selected from the group consisting of the Groups 2 to 4, 7, 13 and 14 and whose atomic number falls within the range of from 12 to 82. More preferably used herein are, for instance, oxides and double oxides containing at least one member selected from the group consisting of magnesium, calcium, barium, yttrium, lanthanoid elements, zirconium, manganese, aluminum and silicon.

Moreover, the double oxide constituting the composite nickel fine powder of the present invention is preferably at least one member selected from the group consisting of double oxides represented by the following general formula:

$$Ba_mX_{1-m}Ti_nZ_{1-n}O_3$$

In the general formula, X represents Sr, Ca, Mg or Pb; Z represents Zr, Y, Sn or Ge; m ranges from 0 to 1, and n ranges from 0 to 1.

Specific examples of the foregoing oxides and double oxides include MgO, CaO, SrO, BaO, ZnO, $Al_2O_3$, $Ga_2O_3$, $Y_2O_3$, $SiO_2$, $TiO_2$, $ZrO_2$, $Cr_2O_3$, $MnO_2$, $Mn_3O_4$, $Nb_2O_5$, $BaTiO_3$, $CaTiO_3$, $SrTiO_3$, $BaZrO_3$, $CaZrO_3$, $SrZrO_3$, (Mg, Ca)$TiO_3$, (Ba, Ca)(Ti, Zr)$O_3$, $PbTiO_3$, Pb(Zr, Ti)$O_3$, (Pb, Ca)$TiO_3$, $MgAl_2O_4$, $BaTi_4O_9$, $Nd_2O_3$, $Sm_2O_3$, $Dy_2O_3$, $Er_2O_3$ and $Ho_2O_3$, which may be used alone or in any combination. Moreover, these oxides and/or double oxides may be doped with an oxide of, for instance, Nb, W, La, Y and/or Mo.

In the composite nickel fine powder of the present invention, the total amount of the at least one member selected from the group consisting of the foregoing oxides and double oxides attached to the metal nickel fine particles preferably ranges from 0.05 to 10% by mass, more preferably 0.5 to 10% by mass and still further preferably 1 to 10% by mass on the basis of the mass of the metal nickel fine particles. If the total attached amount of the oxide and/or double oxide is less than 0.05% by mass, the effect achieved through the attachment of the oxide and/or double oxide is apt to be insufficient. On the other hand, if the attached amount thereof exceeds 10% by mass and the resulting composite nickel fine powder is used as a material for preparing an internal electrode of multilayer ceramic capacitors, the dielectric properties of the resulting capacitor have a tendency of being adversely affected.

The saturated or unsaturated fatty acid as a component of the composite nickel fine powder of the present invention may be, for instance, saturated fatty acids represented by the general formula: $C_nH_{2n+1}COOH$, or unsaturated fatty acids represented by, for instance, the general formulas: $C_nH_{2n-1}COOH$, $C_nH_{2n-3}COOH$ and $C_nH_{2n-5}COOH$. In this respect, the difference between the effects achieved by the use of saturated fatty acid and the use of unsaturated fatty acid is not clear, but the experimental results seem to indicate that a good result can be obtained when using an unsaturated fatty acid.

Specific examples of such saturated fatty acids include enanthic acid ($C_6H_{13}COOH$), caprylic acid ($C_7H_{15}COOH$), pelargonic acid ($C_8H_{17}COOH$), capric acid (decanoic acid) ($C_9H_{19}COOH$), undecylic acid ($C_{10}H_{21}COOH$), lauric acid ($C_{11}H_{23}COOH$), tridecylic acid ($C_{12}H_{25}COOH$), myristic acid ($C_{13}H_{27}COOH$), pentadecylic acid ($C_{14}H_{29}COOH$), palmitic acid ($C_{15}H_{31}COOH$), heptadecylic acid ($C_{16}H_{33}COOH$), stearic acid ($C_{17}H_{35}COOH$), nonadecanoic acid ($C_{18}H_{37}COOH$), arachic acid ($C_{19}H_{39}COOH$) and behenic acid ($C_{21}H_{43}COOH$). Preferably used herein include, for instance, decanoic acid, caprylic acid, palmitic acid and stearic acid.

Moreover, specific examples of such unsaturated fatty acids are acrylic acid ($CH_2$=CHCOOH), crotonic or isocrotonic acid ($CH_3CH$=CHCOOH), undecenoic acid ($CH_2$=CH($CH_2$)$_8$COOH), oleic acid or elaidic acid ($C_{17}H_{33}COOH$), cetoleic acid, brassidic acid or erucic acid ($C_{21}H_{41}COOH$), sorbic acid ($C_5H_7COOH$), linoleic acid ($C_{17}H_{31}COOH$), linolenic acid ($C_{17}H_{29}COOH$), arachidonic acid ($C_{19}H_{31}COOH$), with linoleic acid, linolenic acid, oleic acid or the like being preferably used in the present invention.

In the composite nickel fine powder of the present invention, the higher the amount of the fatty acid supported on the nickel fine particles, the higher the tap density of the composite nickel fine powder and the higher the density of printed wiring observed when the nickel fine powder is formed into a paste and then dried. Thus, the composite nickel fine powder permits the formation of an electrode having a high density after firing the paste. Such an effect clearly reveals itself when the supported amount of the fatty acid is not less than 0.01% by mass based on the total mass of the metal nickel fine particles and the oxide and/or double oxide attached to the surface of the nickel fine particles. Further, the effect becomes more conspicuous when the supported amount of the fatty acid is not less than 0.05% by mass. However, if the supported amount of the fatty acid is gradually increased and the resulting composite nickel fine powder is formed into a paste, a part of the fatty acid supported on the surface of the nickel fine particles is released from the surface and dissolved or dispersed in the resulting paste. Therefore, the supported amount of the fatty acid preferably ranges from 0.01 to 1% by mass and more preferably 0.05 to 0.5% by mass.

In the composite nickel fine powder of the present invention, the oxide and/or double oxide may be attached to the surface of the metal nickel fine particles according to a wet-supporting method, a dry-supporting method or a semi-dry-supporting method in which an aqueous suspension of ultrafine particles of a metal oxide or a double oxide is supported on the metal nickel fine particles and then dried.

The wet-supporting method comprises, for instance, the steps of adding, to a slurry in which metal nickel fine particles are dispersed, an aqueous solution of at least one member selected from the group consisting of a water-soluble salt of a metal element belonging to the groups 2 to 14 of the Periodic Table and whose atomic number falls within the range of from 12 to 82, for instance, halides, nitrates, sulfates, oxalates and oxides of those metal element, and aluminates and silicates of alkali metal, then adjusting the pH of the resulting mixture with an acid or an alkali to thus attach the metal oxide and/or double oxide derived from the foregoing water-soluble salt to the surface of the nickel fine particles.

In the wet-supporting method, the nickel fine particles as a starting material may be those prepared according to either dry methods or wet methods. However, it is preferable to prepare nickel fine particles serving as a starting material according to such a wet method as described above, if necessary, lightly oxidizing the surface of the nickel fine particles with an appropriate oxidizing agent according to a wet method and then practicing the wet-supporting method.

Thus, the oxide and/or double oxide can be attached to the surface of the metal nickel fine particles by consistent easy wet-treating operations at a low cost.

In addition, the pH of the foregoing mixture is adjusted with an acid or an alkali depending on the kind of the water-soluble salt selected. However, the kinds of acids or alkalis used herein are not restricted to any specific one. For instance, if the following water-soluble salt is used to form the oxide in the parenthesis, an aqueous solution of sodium hydroxide can be used:

Titanium sulfate ($TiO_2$); manganese sulfate ($MnO_2$); chromium chloride ($Cr_2O_3$); yttrium chloride ($Y_2O_3$); zirconium oxychloride ($ZrO_2$).

Moreover, if the following water-soluble salt is used to form the oxide in the parenthesis, a dilute sulfuric acid aqueous solution can, for instance, be used:

Sodium aluminate ($Al_2O_3$); sodium silicate ($SiO_2$).

If the pH of the mixture is adjusted as has been described above, the foregoing water-soluble salt is converted into an oxide or double oxide whereby the oxide or double oxide thus formed is deposited on and attached to the surface of the nickel fine particles to thus give the composite nickel fine powder. It is also possible to optionally stabilize the oxide or double oxide by subjecting the composite nickel fine powder to a heat-treatment.

After attaching the metal oxide and/or double oxide derived from the foregoing water-soluble salts to the surface of the nickel fine particles according to the foregoing wet-supporting method, washing and drying the same, the nickel fine particles provided thereon with the oxide and/or double oxide attached thereto may be subjected to an additional treatment, for instance, a treatment with an apparatus such as Angmill, Hybridizer, a mechanical fusion device, Coatmizer, dispercoating device, or Jetmizer. Thus, the nickel fine particles may undergo collision with one another or with other bodies to thus considerably improve the adhesion strength between the surface of the nickel fine particles and the oxide and/or double oxide present on the surface of the fine particles.

The dry-supporting method comprises, for instance, the steps of attaching, to the surface of metal nickel fine particles, at least one member selected from the group consisting of ultrafine particles of oxides and double oxides containing at least one member selected from the group consisting of metal elements belonging to the Groups 2 to 14 of the periodic tableand whose atomic number ranges from 12 to 82; leading the nickel fine particles to which the ultrafine particles are attached, to collide with one another or with other bodies to thus attach the ultrafine particles to the surface of the nickel fine particles.

The ultrafine particles of the oxide and/or double oxide can be uniformly attached to the surface of the nickel fine particles in a small amount if the particle size of the ultrafine particles is reduced to a level as small as possible. Therefore, the ultrafine particles have a particle size of not more than 0.5 μm, more preferably not more than 0.1 μm and most preferably not more than 0.05 μm.

The ultrafine particles of the oxide and/or double oxide can be attached to the surface of the metal nickel fine particles by mixing these particles and then leading the nickel fine particles carrying the ultrafine particles attached thereto to collide with one another or with other bodies; or by introducing the nickel fine particles and the ultrafine particles of the oxide and/or double oxide into an apparatus such as Angmill, Hybridizer, a mechanical fusion device, Coatmizer, dispercoating device, or Jetmizer to thus ensure simultaneous attachment and adhesion.

The semi-dry-supporting method comprises, for instance, the steps of mixing, with heating, metal nickel fine particles with a suspension prepared by dispersing, in a medium, at least one member selected from the group consisting of ultrafine particles of metal elements belonging to the Groups 2 to 14 of the periodic tableand whose atomic number falls within the range of from 12 to 82; removing the medium of the suspension to thus make the ultrafine particles to attach to the surface of the nickel fine particles; then leading the nickel fine particles to which the ultrafine particles are attached to collide with one another or with other bodies to thus make the ultrafine particles to attach to the surface of the nickel fine particles.

In the composite nickel powder of the present invention, the fatty acid can preferably be applied onto the surface of the metal nickel fine particles wherein the oxide and/or double oxide are attached to the surface thereof, by mixing a solution of a fatty acid in a diluent with the oxide and/or double oxide-supporting nickel fine powder to thus make the solution adaptive to the surface of the fine powder, then removing the excess solution by, for instance, filtration under reduced pressure and finally drying. Such a diluent may be any one insofar as it can dissolve the fatty acid and specific examples thereof are acetone, ethanol, methanol and propanol.

If the fatty acid is applied onto the surface of the composite nickel fine powder of the present invention, the nickel fine powder has a high tap density, a printed wiring having a high density can be achieved when the nickel fine powder is formed into a paste and then dried. Therefore, the nickel fine powder of the present invention permits the formation of an electrode having a high density after firing. The reason of this has not yet clearly been elucidated, but this would result from the reduction in the frictional resistance of the powder.

As has been described above in detail, the composite nickel fine powder of the present invention is excellent in resistance to heat shrinkage, has a high tap density, and thus permits the formation of a printed wiring having a high density when the fine powder is formed into a paste and then dried. Moreover, the composite nickel fine powder thus permits the formation of an electrode having a high density after firing and accordingly, has characteristic properties suitable for use as a material for making a conductive paste, in particular, suitable for use as an internal electrode material for a multilayer ceramic capacitor.

The present invention will be described in more detail with reference to the following Examples including working Examples and Comparative Examples, but the present invention is not restricted to these specific Examples at all.

EXAMPLES 1 to 17

To 100 parts by mass of nickel fine powder having an average particle size, as determined by the SEM observation, as set forth in the following Table 1, there was added an ultrafine particulate oxide or double oxide whose kind, average particle size and amount (part by mass) were specified in Table 1, followed by sufficient mixing, with stirring, of the resulting mixture. The ultrafine particulate oxide or double oxide was thus attached to the nickel fine particles. Then the nickel fine particles were introduced into Hybridizer (available from NARA Machinery Co., Ltd.), followed by circulation thereof at 8000 rpm for 5 minutes to thus give composite nickel fine powder wherein the ultrafine particulate oxide or double oxide was attached to the surface of the nickel fine particles.

The resulting composite nickel fine powder (100 g) was immersed in a solution of a fatty acid whose kind and amount were listed in the following Table 1 in a solvent whose kind and amount were likewise specified in Table 1, followed by mixing them with stirring for 5 minutes, separation of the powder from the mixture through filtration and then drying the powder at 70° C. to give organic-inorganic surface-modified nickel fine powder.

The resulting organic-inorganic surface-modified nickel fine powder was inspected for the tap density. The results thus obtained are summarized in the following Table 1.

In addition, the organic-inorganic surface-modified nickel fine powder was further subjected to the thermogravimetric analysis (TG-DTA) in the atmosphere. More specifically, the mass of each sample was determined, then the temperature thereof was raised up to 400° C. at a rate of heating of 10° C./min and then the temperature of the sample was maintained at 400° C. for 2 hours. At this stage, the mass of each sample was again determined to thus obtain a rate (A%) of increase in mass relative to the initial mass of each sample. Thereafter, the temperature of each sample was raised up to 1000° C. (at this stage, all of the nickel was deemed to be converted into nickel oxide) and the mass of each sample was again determined to obtain a rate (B%) of increase in mass relative to the initial mass of each sample. The degree of oxidization of nickel powder when it was maintained at 400° C. for 2 hours could be calculated by determination of the value: A/B. The results thus obtained are listed in Table 1.

Moreover, 0.5 g of the organic-inorganic surface-modified nickel fine powder was pressed at a pressure of 98 MPa to thus form the powder into a pellet having a diameter of 5 mm and a height of about 6 mm. The resulting pellet was heated up to 1100° C. at a rate of heating of 10° C./min in a nitrogen gas atmosphere using a thermomechanical analysis device (TMA/SS6000 available from Seiko Instruments Inc.) and then each sample was inspected for the heat shrinkage factor in terms of the thickness relative to that of the green compact prior to heating. The shrinkage factors thus determined are summarized in the following Table 1.

As will be clear from the data listed in Table 1, the composite nickel fine powder of the present invention has a high tap density as compared with the nickel fine powder prepared in Examples 2, 5, 8 and 14 (Comparative Examples), in which any fatty acid is not supported on the surface of the nickel fine particles. In addition, the composite nickel fine powder of the present invention, in which the oxide is attached to the surface of the nickel fine particles, has quite small heat shrinkage factor at a high temperature as compared with the nickel fine powder of Examples 3, 6, 9 and 15 (Comparative Examples) which are free of any oxide attached to the surface of the nickel fine particles.

What is claimed is:

1. Composite nickel fine powder comprising metal nickel fine particles, at least one member attached to the surface of the nickel fine particles and selected from the group consisting of oxides and double oxides containing at least one metal element selected from the group consisting of the Groups 2 to 14 of the Periodic Table and whose atomic number falls within the range of from 12 to 82, and a saturated or unsaturated fatty acid supported on the surface of the nickel fine particles provided thereon with the oxide and/or double oxide attached thereto.

2. The composite nickel fine powder as set forth in claim 1, wherein the oxide and double oxides are those containing at least one metal element selected from the group consisting of the Groups 2 to 4, 7, 13 and 14 and whose atomic number falls within the range of from 12 to 82.

3. The composite nickel fine powder as set forth in claim 2, wherein the oxide and double oxides are those containing at least one member selected from the group consisting of magnesium, calcium, barium, yttrium, lanthanoid elements, zirconium, manganese, aluminum and silicon.

4. The composite nickel fine powder as set forth in claim 1, wherein the double oxide is at least one member selected from the group consisting of those represented by the following general formula:

$Ba_mX_{1-m}Ti_nZ_{1-n}O_3$

TABLE 1

| Ex. No. | $R_{av}$ (I) μm | Kind of oxide | $R_{av}$ (II) nm | Amt. of oxide ppm** | Kind of fatty acid | Amt. of fatty acid, g | Kind of solvent | Amt. of solvent 1 | Tap density g/cm³ | Deg. of oxidation *** | Shrinkage factor |
|---|---|---|---|---|---|---|---|---|---|---|---|
| 1 | 0.6 | Al₂O₃ | 15 | 3 | Capric acid | 1 | Acetone | 0.1 | 4.0 | 54 | 0.49 |
| 2* | 0.6 | Al₂O₃ | 15 | 3 | — | — | — | — | 3.1 | 58 | 2.12 |
| 3* | 0.6 | — | — | — | Capric acid | 1 | Acetone | 0.1 | 4.4 | 81 | 14.3 |
| 4 | 0.2 | Y₂O₃ | 15 | 5 | Stearic acid | 10 | Acetone | 0.1 | 3.8 | 66 | 2.12 |
| 5* | 0.2 | Y₂O₃ | 15 | 5 | — | — | — | — | 2.8 | 68 | 2.87 |
| 6* | 0.2 | — | — | — | Stearic acid | 10 | Acetone | 0.1 | 3.8 | 88 | 15.1 |
| 7 | 0.6 | ZrO₂ | 25 | 1 | Oleic acid | 1 | Acetone | 0.1 | 3.9 | 48 | 5.85 |
| 8* | 0.6 | ZrO₂ | 25 | 1 | — | — | — | — | 3.2 | 42 | 5.45 |
| 9* | 0.6 | — | — | — | Oleic acid | 1 | Acetone | 0.1 | 4.3 | 80 | 12.3 |
| 10 | 0.6 | MgO | 10 | 1 | Capric acid | 1 | Ethanol | 0.1 | 3.8 | 52 | 2.59 |
| 11 | 0.6 | SiO₂ | 7 | 3 | Capric acid | 1 | Acetone | 0.1 | 3.7 | 64 | 4.01 |
| 12 | 0.6 | BaTiO₃ | 30 | 3 | Capric acid | 1 | Acetone | 0.1 | 4.2 | 59 | 6.18 |
| 13 | 0.6 | SrTiO₃ | 30 | 3 | Linolenic acid | 1 | Acetone | 0.1 | 4.0 | 61 | 6.86 |
| 14* | 0.6 | SrTiO₂ | 30 | 3 | — | — | — | — | 3.1 | 56 | 6.43 |
| 15* | 0.6 | — | — | — | Linolenic acid | 1 | Acetone | 0.1 | 4.1 | 77 | 14.5 |
| 16 | 0.6 | Ho₂O₃ | 25 | 3 | Caprylic acid | 1 | Acetone | 0.1 | 3.9 | 62 | 7.20 |
| 17 | 0.6 | Mn₃O₄ | 25 | 3 | Palmitic acid | 1 | Acetone | 0.1 | 3.9 | 58 | 3.37 |

$R_{av}$ (I): Average particle size of nickel fine powder.
$R_{av}$ (II): Average particle size of Oxide.
*: Comparative Example
**: pbm = part by mass
***: The degree of oxidation observed after treating a sample at 400° C. for 2 hours.

In the general formula, X represents Sr, Ca, Mg or Pb; Z represents Zr, Y, Sn or Ge; m ranges from 0 to 1, and n ranges from 0 to 1.

5. The composite nickel fine powder as set forth in claim 1, wherein the total attached amount of the at least one member selected from the group consisting of oxides and double oxides ranges from 0.05 to 10% by mass on the basis of the mass of the metal nickel fine particles.

6. The composite nickel fine powder as set forth in claim 5, wherein the supported amount of the fatty acid ranges from 0.01 to 1% by mass on the basis of the total mass of the metal nickel fine particles and the oxide and/or double oxide attached to the surface of the metal nickel fine particles.

7. A conductive paste comprising composite nickel fine powder as set forth in claim 6.

8. The conductive paste as set forth in claim 7, wherein the particle size of the metal nickel fine particles is not more than 1 μm.

9. An internal electrode for multilayer capacitors comprising composite nickel fine powder as set forth in claim 6.

10. The internal electrode as set forth in claim 9, wherein the particle size of the metal nickel fine particles is not more than 1 μm.

11. The composite nickel fine powder as set forth in claim 1, wherein the fatty acid is an unsaturated fatty acid.

12. The composite nickel fine powder as set forth in claim 1, wherein the fatty acid is at least one member selected from the group consisting of decanoic acid, caprylic acid, palmitic acid, linoleic acid, linolenic acid, oleic acid and stearic acid.

13. The composite nickel fine powder as set forth in claim 1, wherein the supported amount of the fatty acid ranges from 0.01 to 1% by mass on the basis of the total mass of the metal nickel fine particles and the oxide and/or double oxide attached to the surface of the metal nickel fine particles.

14. A conductive paste comprising composite nickel fine powder as set forth in claim 1.

15. The conductive paste as set forth in claim 14, wherein the particle size of the metal nickel fine particles is not more than 1 μm.

16. An internal electrode for multilayer capacitors comprising composite nickel fine powder as set forth in claim 1.

17. The internal electrode as set forth in claim 16, wherein the particle size of the metal nickel fine particles is not more than 1 μm.

* * * * *